Nov. 12, 1940.　　　F. C. F. PORTAIL　　　2,221,106
ELECTRIC BATTERY
Filed May 21, 1936　　　2 Sheets-Sheet 1
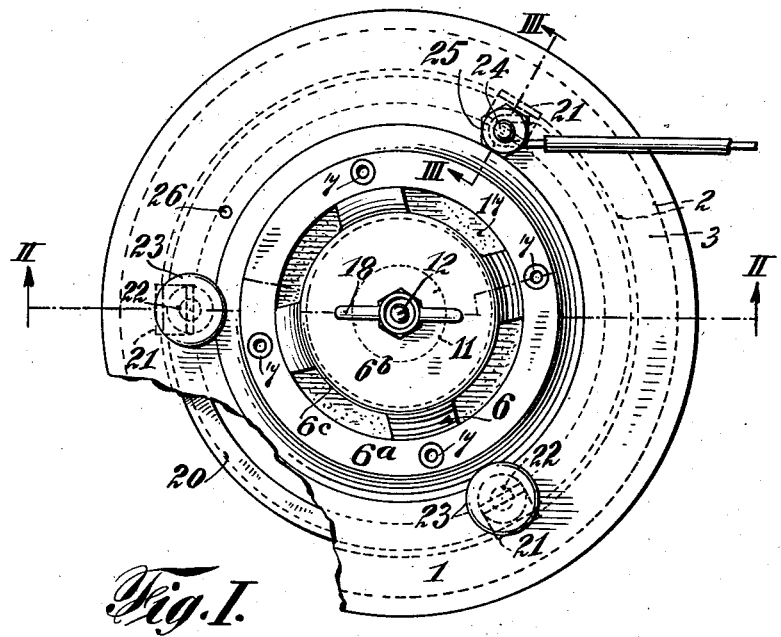
Fig. I.
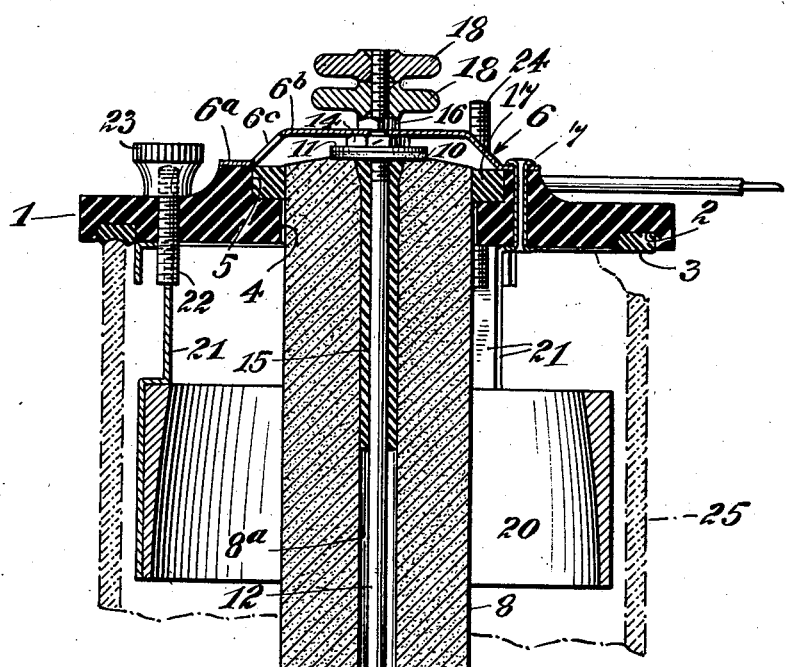
Fig. II.
INVENTOR:
Fernand Charles Frédéric Portail
BY Ramsey, Kent, Chisholm & Lutz
his ATTORNEYS Nov. 12, 1940.                F. C. F. PORTAIL                2,221,106
                              ELECTRIC BATTERY
                              Filed May 21, 1936         2 Sheets-Sheet 2
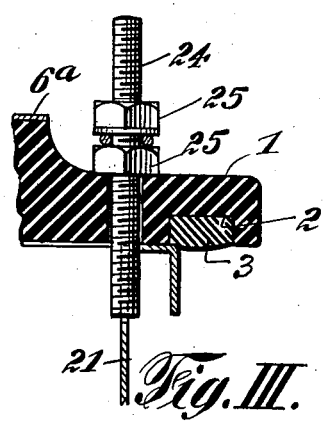
Fig. III.
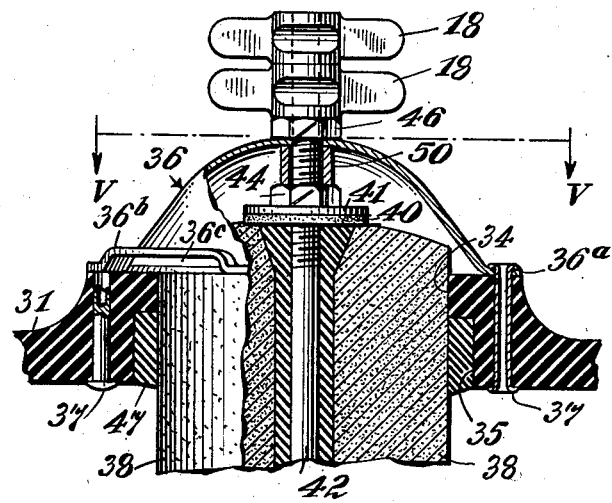
Fig. IV.
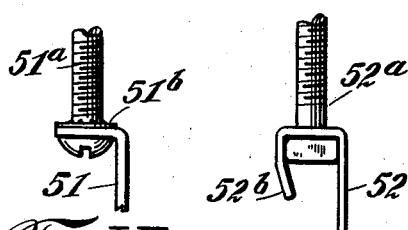
Fig. VI.   Fig. VII.
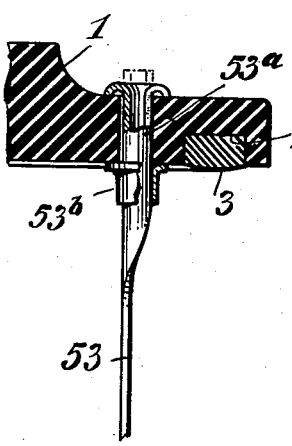
Fig. VIII.
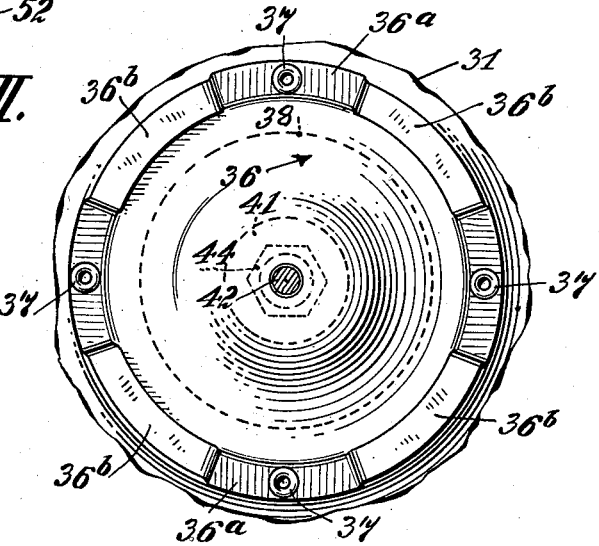
Fig. V.
INVENTOR.
Fernand Charles Frédéric Portail
BY Ramsey, Kent, Chisholm + Lutz
           his ATTORNEYS Patented Nov. 12, 1940

2,221,106

UNITED STATES PATENT OFFICE 2,221,106

ELECTRIC BATTERY

Fernand Charles Frédéric Portail, Gennevilliers, France, assignor to Le Carbone Co., Gennevilliers, Seine, France, a corporation of France Application May 21, 1936, Serial No. 80,945

2 Claims. (Cl. 136—136)

This invention relates broadly to electric batteries, but most of the features of the invention are particularly applicable to air depolarized primary batteries. Accordingly, an air depolarized battery embodying the invention is shown and described, in order that the invention may be fully disclosed in the most appropriate manner. In some respects, the present invention is an improvement upon the battery disclosed in the U. S. patent to H. G. Thompson et al., No. 2,044,923, June 23, 1936.

Signal systems (e. g. railway, marine and highway signal systems) require primary batteries which have a long life and are capable of furnishing reliable service with very infrequent attention or inspection. A type of battery which is widely and successfully used in these systems, is an air depolarized battery having carbon and zinc electrodes and a liquid electrolyte of caustic soda in solution. The general characteristics of this type of battery, including the advantages of air depolarization, are known in the battery art and need not be detailed herein. However, certain difficulties have sometimes arisen in the operation of these batteries, particularly under unusual or adverse operating conditions.

Signal batteries are usually located in outdoor cabinets, vaults, etc., and often remain unattended for months at a time. Climatic changes to which a given battery installation may be subjected sometimes involve temperature variations of as much as 100 degrees F., and even more. The air depolarization feature requires that the carbon of the battery cell be exposed to the air outside of the cell and that the battery cabinet be ventilated. Thus these batteries are sometimes exposed to the action of fine snow which sifts into the battery cabinets, lodges on the batteries, and undergoes subsequent cycles of melting and freezing. Also signal batteries may be subjected to heavy overloads brought about by grounded or short circuited lines; and this has caused serious battery impairment, and even failure, particularly during the later stages of the normally useful life of the battery.

A general object of this invention is to so improve air depolarized batteries as to render them more certain and reliable under adverse operating conditions.

Another object of the invention is to provide an air depolarized battery capable of better withstanding heavy overloads.

A further object of the invention is to improve the ruggedness and reliability of liquid electrolyte primary batteries (e. g. caustic soda batteries) and particularly to improve their reliability during the later stages of their normal useful life.

A still further object of the invention is to decrease the cost of air depolarized batteries having liquid electrolyte.

Various specific and detailed objects of the invention will be apparent to those skilled in the battery art, from the disclosure and discussion herein.

Fig. I of the drawings is a plan view of a battery construction embodying the present invention, a part of the cover being broken away to disclose one of the electrodes.

Fig. II is a vertical section taken on the line II—II of Fig. I and with an electrolyte container added in dot-dash lines.

Fig. III is a fragmentary vertical section, taken on the line III—III of Fig. I.

Fig. IV is a fragmentary view showing a modification of the construction shown in Figs. I and II. In general, the view is a central vertical section, but some of the parts are shown in elevation.

Fig. V is, in substance, a fragmentary plan view of the construction shown in Fig. IV. Technically the view is taken on the line V—V of Fig. IV.

Fig. VI is a detail elevation showing a first alternative zinc support.

Fig. VII is a detail elevation showing a second alternative zinc support.

Fig. VIII is a detail view, partly in elevation and partly in vertical section, showing a third alternative zinc support attached to the cover.

While the battery may be made in different sizes, the drawings are to scale for one size of battery, the scale of Figs. I and II being two-thirds that of Figs. III to VIII and the outside diameter of cover 1 being seven inches.

Reference will first be had to Figs. I to III. A cover 1 of suitable molded insulating material is provided with an annular groove 2, a centrally located hole 4, and an annular rabbet 5. Within the groove 2 there is a ring of plastic sealing material 3. Over the hole 4 there is a shield 6 which has a flange 6$^a$ and a raised center portion 6$^b$. This shield is suitably attached to the cover 1, as by a plurality of tubular rivets 7 (four shown) which pass through cover 1 and flange 6$^a$.

An electrode 8 is in the form of a cylindrical stick of coherent activated carbon having a longitudinal bore 8$^a$. A metal washer 9 is positioned against the bottom of the carbon 8; and a special contact washer 10 is positioned against the top of the carbon. Against the special washer 10 there is a metal washer 11, and a bolt 12 passes through the carbon 8 and the three washers 9, 10, and 11. A nut 14 serves to hold the parts in assembled relation and to firmly clamp the special washer 10 against the upper end of the carbon 8. After the parts thus far described have been assembled with the carbon 8, the bolt 12 is sealed to the carbon by a sealing compound 15 which may be introduced hot through a hole 9a in washer 9. Enough of the compound 15 may be used to fill the bore 8a for the full length of the carbon 8 and even cover washer 9 and the head of bolt 12, but it will serve the purpose to merely fill the top half of the bore 8a with the compound 15.

The carbon electrode assembly, prepared as described, is telescoped through the hole 4 in the cover 1 and then attached to shield 6 by a nut 16. This places the upper end of the carbon in the air chamber formed on top of cover 1 by the shield 6. Preferably the carbon 8 is of such size that it closely fits the hole 4, and the carbon is sealed to the cover 1 by compound 17 which is introduced hot into the rabbet 5. A pair of winged nuts 18, 18 may be provided for wiring connection to the electrode.

An annular zinc electrode 20 is preferably of the shape shown to provide economical distribution of zinc and render the electrode self supporting while the zinc is being consumed by operation of the battery. This shape of zinc is more fully discussed in Patent No. 2,044,923, previously referred to. Attached to the zinc 20 are three suspension straps 21, 21, 21, each of which extends for substantially the full height of the zinc electrode as shown in Fig. II. I prefer to solder these straps to the zinc 20 throughout the full height of the zinc, and then cover the joint and the soldered portion of the straps with a suitable protective varnish to prevent the joint from being attacked by the electrolyte. The upper end of each strap 21 is bent as shown to provide a bearing surface against the under side of cover; and a stud is threaded into a vertical slot which extends downwardly from the top of each strap, and the stud is also soldered to the strap. The three studs pass through the cover 1, and two of the studs 22, 22 are short studs provided with insulated retaining nuts 23, 23. The third stud 24 is a long one and is provided with nuts 25, 25 (Fig. III) which may be used to make wiring connection to the zinc electrode.

The present invention involves no improvement in the zinc material and the carbon material of the electrodes, these being commercial battery materials. It will be understood, however, that the terms "zinc" and "carbon" are used as in battery practice and not in a strict chemical sense. It is usual to provide the zinc electrode with a small mercury content. For the carbon electrode I prefer a good grade of commercial activated carbon. This carbon is exceedingly porous and readily transmits air to the meeting surface of the carbon and electrolyte; and the carbon acts catalytically to aid in uniting oxygen of the air with nascent hydrogen produced by the battery. However, this carbon effectively repels the electrolyte except for a slight surface wetting.

Quite a variety of sealing compounds are available for seals 3, 15, and 17, but the choice of particular sealing materials will vary with the materials to which the seal is to be made, the temperatures at which the battery is to be operated, etc. Seal 15 should be made with a material which will stick to both bolt 12 and the particular carbon used for electrode 8. Seal 17 should be made with a material which will stick to both the carbon and the cover 1. The material of seals 15 and 17 should preferably remain hard at all temperatures to which the battery is to be subjected, but should be capable of being melted to be poured into place. In general, hard grades of mineral pitches, pitch mixtures, and electrical sealing compounds may be used for both seals 15 and 17.

The material at 3 should be a soft composition which will remain plastic at all temperatures to which the battery is to be subjected. When the cover 1 is applied to a jar (container) 25, the weight of the cover assembly molds the sealing material 3 to the mouth of the jar and makes an air-tight seal. Accordingly, this sealing material should be plastic but should not melt at temperatures to which the battery is to be subjected. In general, soft grades of mineral pitches, pitch mixtures, and electrical sealing compounds may be used for the purpose. Cable joint compound containing petroleum pitch, mineral oil, and resin, makes a good material for the purpose.

Of course, the material selected for each of the seals 3, 15, and 17 should be one that is impervious to the electrolyte and battery fumes, and be resistant to the action thereof. The cover 1 should be similarly impervious and resistant, and may be made of vulcanized fiber or be molded from a phenol condensation product. Inferior materials may, however, be used for cover 1 if the entire bottom surface of it be coated with material such as is used at 3.

The various metal structural parts (exclusive of the zinc electrode proper) should also be made of materials which are resistant to the action of the electrolyte and its fumes. Tinned steel or plated with nickel is suitable for bolt 12 and washers 9 and 11. Tinned copper is suitable for rivets 7 and straps 21. The shield 6 may be made of molded insulating material, or may be made of sheet metal coated with acid and alkali resistant enamel or paint. I have found that metal in contact with activated carbon eventually corrodes and often increases the internal resistance of the battery during the later stages of its normally useful life. And I have also found that this injurious result can be prevented by special washer 10 which makes direct electrical contact with the activated carbon. This washer 10 should be a good conductor of electricity, non-oxidizable, and of very low porosity. A good material for washer 10 is unactivated agglomerated carbon of little porosity. This carbon may be similar to ordinary unactivated battery electrode carbon, either impregnated with paraffin wax or not. The performance characteristics of this battery during the later stages of its useful life are also improved by the straps 21 which extend to the bottom of zinc 20. Since these straps are not consumed during the operation of the battery, they serve to maintain a skeleton distribution of metal corresponding to the original distribution of metal in the zinc electrode 20.

Batteries of this type usually require a layer of oil on top of the electrolyte to prevent oxidation of the electrolyte. Oil seriously damages activated carbon, so the use of oil requires a protective sleeve for the upper portion of the carbon, and requires special care in installing and servicing the battery. These difficulties are eliminated by the present construction. The small amount of air initially in contact with the surface of the electrolyte is quickly displaced and expelled by gas (mostly hydrogen) generated by the cell; and seals 3 and 17 prevent the reentry of air. Of course, the battery has to be vented to prevent pressure from being built up by the cell gases; but if this is done through a single passage of small size and considerable length, the flow through the passage will be limited (for practical purposes) to the outward flow of the cell gases. For this purpose, the cover 1 may be provided with a single vent hole 26 (Fig. I). However, I prefer to omit even this vent, and provide venting through one of the rivets 7 which is made tubular throughout, as shown in Fig. II. The three remaining rivets 7 may have solid heads or be plugged with sealing compound.

The shield 6 not only protects the exposed end of the carbon 8, but provides an air chamber from which the carbon receives air for depolarization of the battery. Ordinarily the air chamber is in communication with the outer air through openings 6c, but the air within the chamber is available during any temporary closure of opening 6c by snow or ice.

Figs. IV and V show a modification which provides greater protection for the exposed end of the carbon and a larger reserve air chamber. The jar cover 31 has a central hole 34, surrounded by an annular rabbet 35. A dome-like shield 36 is provided with a flange 36a which is riveted to the cover 31 by tubular rivets 37. Between the rivets the flange is elevated at 36b to provide passages 36c which communicate with the outer air.

The activated carbon 38 is provided with a bolt 42, special contact washer 40, metal washer 41, and clamping nut 44. The carbon extends, as shown, through the hole 34, and a nut 46 secures the carbon assembly to shield 36. A spacer 50 positions the carbon at the desired elevation, but preferably the end of the carbon projects above the top of cover 31 as shown in the drawings. Compound 47 seals the carbon to the cover 1. In this instance the annular rabbet and seal is on the under side of the cover to make it easier to introduce the compound, but the seal may be on top of the cover as in Fig. II, and vice versa. Even if snow drifts into the openings 36c, it will bank against the vertical face of the carbon 38, and the top surface of the carbon will be left in condition to absorb air.

The carbon electrode may be made of such size that its useful life is equalized with the life of the zinc electrode. In this case the whole cover assembly is used but once, and discarded when the battery is exhausted. However, a larger carbon electrode may be used, and the zinc electrode renewed for several cycles of battery operation. In this case the zinc assembly should be readily detachable from the cover 1. This is provided in Figs. I to III. Alternative constructions for quick detachability are shown in Figs. VI and VII. In Fig. VI the upper end of the zinc supporting strap 51 is bent horizontally and provided with an attachment bolt 51a, held to the strap by a spring finger washer 51b. In Fig. VII the upper end of the zinc supporting strap 52 is provided with a square headed attachment bolt 52a, and the tip 52b of the strap is bent as shown to hold the bolt in place and prevent it from rotating with respect to the strap.

Fig. VIII shows an attachment which may be used when the zinc electrode is not to be renewed. Each zinc supporting strap 53 has its upper end rolled into a tubular rivet portion 53a. A thimble 53b is telescoped onto the rivet portion to give a bearing on the under side of the cover 1, and the end of the rivet portion is clinched against the top of the cover. To prevent ingress of air, the rivet portions 53a may be plugged with sealing compound or otherwise.

In compliance with the patent statutes, I have disclosed the best forms in which I have contemplated applying my invention, but it will be understood that the disclosure is illustrative and not limiting.

What I claim is:

1. A battery construction comprising: a perforated jar cover of insulating material rigid at all temperatures to which the battery may be subjected in operation; a coherent activated carbon electrode depending from the cover, the upper portion of said electrode being telescoped into the perforation of the cover thereby exposing the top surface of the electrode to the outer air, sealing material sealing the electrode to the cover and thereby protecting the top surface of the electrode from battery fumes; a shield forming an air chamber over the top surface of said electrode, the shield being open to the outer air and being attached to said cover; a supporting metallic rod extending downwardly into said electrode, said rod being attached to said electrode and being sealed thereto; means securing said rod to said shield to support the electrode independently of the seal between the electrode and the cover; and an electrical connection to the top surface of said activated carbon and resistant to corrosive action of the type induced by moist air engaging activated carbon, said connection comprising a piece of unactivated carbon in direct contact with the top surface of the electrode, a metal contact member on top of the piece of unactivated carbon, and means electrically connecting said contact member to said rod to form a terminal connection including the unactivated carbon.

2. A battery construction comprising: a jar cover of insulating material rigid at all temperatures to which the battery may be subjected in operation, the cover having a central aperture and an annular rabbet about the aperture on the under surface of the cover; a coherent activated carbon electrode depending from the cover, the upper end of said electrode being telescoped into the aperture of the cover thereby exposing the top surface of the electrode to the outer air; sealing material located in said rabbet and sealing the electrode to the cover; a shield forming an air chamber over the upper end of said electrode, the shield being open to the outer air and being attached to said cover; a supporting metallic rod extending downwardly into said electrode, said rod being attached to said electrode and being sealed thereto; means securing said rod to said shield to support the electrode independently of the seal between the electrode and the cover; and an electrical connection to the top surface of said activated carbon and resistant to corrosive action of the type induced by moist air engaging activated carbon, said connection comprising a disc of unactivated carbon positioned against the top surface of said electrode and metallic means clamping the unactivated carbon against the electrode and connecting it to said rod to form a terminal connection including the unactivated carbon.

FERNAND CHARLES FRÉDÉRIC PORTAIL.